United States Patent [19]

Hennecke

[11] Patent Number: 4,943,016
[45] Date of Patent: Jul. 24, 1990

[54] PIPE HANGER ASSEMBLY

[76] Inventor: Richard Hennecke, 1804 Dixie Dr., Waukesha, Wis. 53186

[21] Appl. No.: 848,235

[22] Filed: Apr. 4, 1986

Related U.S. Application Data

[63] Continuation-in-part of Ser. No. 659,517, Oct. 12, 1984, abandoned.

[51] Int. Cl.$^5$ .............................................. A47B 96/00
[52] U.S. Cl. ......................................... 248/59; 248/62
[58] Field of Search ....................... 248/59, 62, 58, 60; 411/535, 531

[56]  References Cited

U.S. PATENT DOCUMENTS

| | | | |
|---|---|---|---|
| 1,579,419 | 4/1926 | Tomkinson | 248/59 |
| 1,582,358 | 4/1926 | Tomkinson | 248/59 |
| 1,904,315 | 4/1933 | Kenway | 248/62 |
| 2,177,816 | 10/1939 | Wertman | 248/62 X |
| 2,893,670 | 7/1959 | Adams | 248/59 |
| 2,931,605 | 4/1960 | Kelly | 248/62 X |
| 3,167,286 | 1/1965 | Sherburne | 248/62 |
| 3,171,624 | 3/1965 | Leahy | 248/62 |
| 3,603,538 | 9/1971 | Vitas | 248/59 |
| 4,305,557 | 12/1981 | Kowalski | 248/62 |
| 4,330,491 | 5/1982 | Doshi et al. | 248/58 X |

Primary Examiner—Ramon O. Ramirez
Attorney, Agent, or Firm—Arthur L. Nelson

[57] ABSTRACT

A pipe hanger assembly adapted to be suspended from a support or the like for supporting a pipe or the like, in which the pipe hanger assembly comprises a washer member having a first aperture therethrough for receiving the support, the washer member also including additional aperture means for receiving the respective opposite ends of a flexible multi-strand metal cable which receives the pipe or duct member being supported. Each end of the cable has secured thereto a corresponding end sleeve member which serves to retain the cable on the washer member. The metal cable is preferably coated or sheathed with an insulating and cushioning material along at least the portion of its length which engages the pipe or duct, but the ends of the cable to which the end sleeves are secured should not be coated or sheathed with the insulating material. In one embodiment of the hanger assembly, the aperture means in the washer member receives a stud member which is distinct from and does not communicate with the additional aperture means which receive the ends of the cable; whereas in another embodiment of the pipe hanger assembly, the aperture means in the washer member which receives the stud member communicates with at least one of the additional aperture means which receive the ends of the cable; and in still another embodiment, the aperture means in the washer member which receives the stud member communicates with both oppositely disposed aperture means which receives the respective opposite ends of the cable. In another embodiment the cable operates as the pipe support and washer member support as an integral structure.

9 Claims, 3 Drawing Sheets

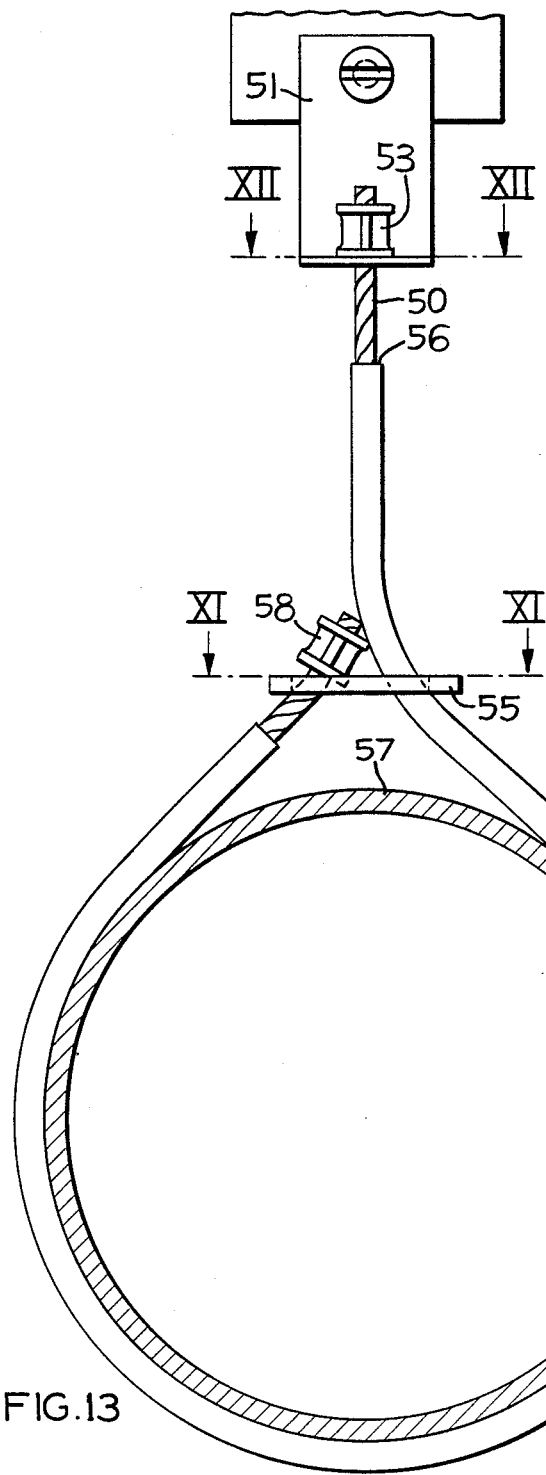
FIG. 11
FIG. 12
FIG. 13
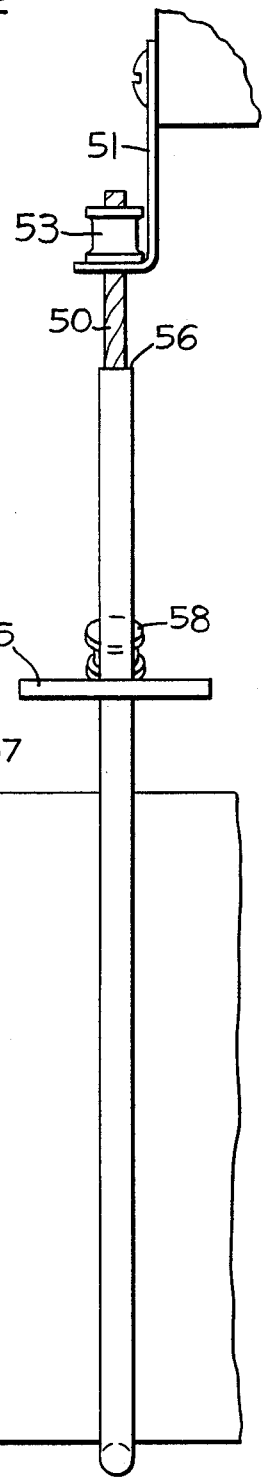
FIG. 14

PIPE HANGER ASSEMBLY

This application is a continuation-in-part-application of U.S. patent application Ser. No. 06/659,517, filed Oct. 12, 1984, now abandoned.

BACKGROUND OF THE INVENTION

1. Field of the Invention

This invention relates to a pipe hanger assembly for suspending pipes, ductwork, and the like, and more particularly to a pipe hanger assembly which utilizes a multi-strand cable as the suspending element for the pipe.

2. Description of the Prior Art

U.S. Pat. Nos. 1,904,315 to Kenway, issued on Apr. 18, 1933; 2,893,670 to Adams, issued July 7, 1959; and 3,171,624 to Leahy, issued Mar. 2, 1965, all show pipe hangers formed of a single resilient wire which embraces the pipe member of the like in supporting relation thereto, with each of these three patents also showing swaged enlarged integral end portions such as the swaged heads of buttons 44 of the Kenway patent, or the end portions 34 of FIG. 4 of the Kenway patent which are originally separate members but which are butt-welded to the ends of the ring member 30; or the integral buttons 13 of the Adams patent; or the enlarged heads 26 of the Leahy patent.

U.S. Pat. No. 862,840 to Nelson et al, issued on Aug. 6, 1907 shows a pipe supporting member of loop made of "light metal rope" or "heavy metal cord." U.S. Pat. No. 2,177,816 to Wertman, issued on Oct. 31, 1939, shows an insulator clevis which is used for supporting an insulator member, and shows a flexible steel cable which embraces an insulator and is received in a groove in the insulator.

STATEMENT OF THE INVENTION

It is an object of the present invention to provide a hanger assembly for pipes, ductwork, or the like, in which the suspending member is formed of a multiplicity of metal strands which form a cable, and which has flexibility, strength, and versatility for use with various materials of which the pipe or ductwork may be made.

It is a further object of the invention to provide a pipe hanger assembly in which the pipe suspending member is formed of a multi-strand metal cable, and which is characterized by economy of manufacture, and uncomplicated construction, and which can be sold at a reasonable price.

It is a further object of the invention to provide a pipe hanger assembly for pipes, ductwork or the like which includes a multiple strand metallic cable, and in which the cable is coated or sheathed with an electrically insulating, mechanically cushioning material such as a suitable plastic, as, for example, a Nylon or vinyl coating.

It is a further object of this invention to provide a flexible metal multi-strand cable embracing a pipe and also supporting the hanger.

It is another object of the invention to provide an improved hanger assembly for pipes, ductwork, or the like, formed of a multiple strand metallic cable, in which the pipe hanger cable cooperates with and is supported by a washer means mounted on a supporting stud in such manner as to facilitate ease of assembly and disassembly of the pipe hanger cable relative to the washer means.

In achievement of these objectives, there is provided in accordance with the invention a pipe hanger assembly adapted to be suspended from a support stud or the like for supporting a pipe or the like, in which the pipe hanger assembly comprises a washer member having a first aperture therethrough for receiving the support stud, the washer member also including oppositely-disposed additional aperture means for receiving the respective opposite ends of a multi-strand metal cable which receives the pipe or duct member being supported. Each end of the cable has secured thereto a corresponding end sleeve member which serves to retain the cable on the washer member. The metal cable is preferably coated or sheathed with an insulating material along at least the portion of its length which engages the pipe or duct, but the ends of the cable to which the end sleeves are secured should not be coated or sheathed with the insulating material. In one embodiment of the hanger assembly, the aperture means in the washer member which receives the stud member is distinct from and does not communicate with the oppositely disposed additional aperture means which receive the ends of the cable; whereas in another embodiment of the pipe hanger assembly, the aperture means in the washer member which receives the stud member communicates with at least one of the additional aperture means which receives the ends of the cable; and in still another embodiment, the aperture means in the washer member which receives the stud member communicates with both of the oppositely disposed aperture means which receive the respective opposite ends of the cable.

Further objects and advantages of the invention will become apparent from the following description taken in conjunction with the accompanying drawing in which:

BRIEF DESCRIPTION OF THE DRAWING

FIG. 11 is a cross-section taken on line XI—XI of FIG. 13;

FIG. 12 is a cross-view taken on line XII—XII of FIG. 13;

FIG. 13 is a front view of a modification of the hanger; and

FIG. 14 is a side elevation view of the modification shown in FIG. 13.

DESCRIPTION OF THE PREFERRED EMBODIMENTS

Figure 1:
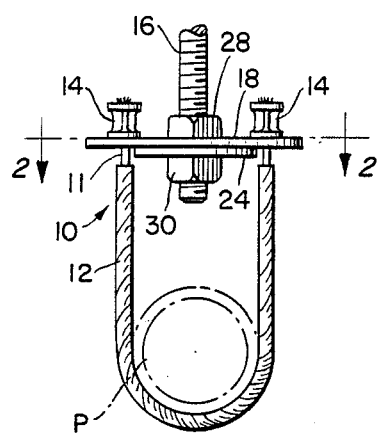
FIG. 1 is a view of the pipe hanger assembly of the invention mounted on a supporting stud and in supporting relation to a pipe member.

Referring now to FIG. 1, there is shown a pipe hanger assembly in accordance with the invention, including a flexible cable generally indicated at 10 formed of multiple strands of a suitable metal wire 11, preferably steel, with the exterior surface of the cable being coated or sheathed with a suitable electrically insulating and cushioning material 12 such as a suitable plastic material. The insulating coating or sheathing is preferably Nylon, but may also be a suitable vinyl plastic.

Figure 8:
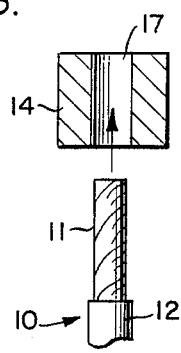
FIG. 8 is an exploded view of one end of the cable and of the corresponding stop sleeve member which is to be positioned on the end of the cable, the view in FIG. 8 being taken prior to the assembly of the stop sleeve member onto the end of the cable.
Figure 9:
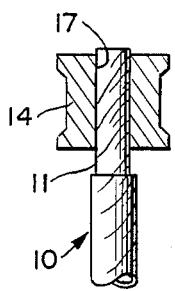
FIG. 9 is an assembled view of the stop sleeve member of FIG. 8 after it has been swaged or compressed onto the end of the cable.

The sheathing or coating 12 on the exterior surface of cable 10 is stripped at each of the opposite ends of the cable, and a stop sleeve 14 having a hollow passage 17 therethrough is slipped over the stripped end of the cable and is swaged or otherwise suitably compressed onto the stripped end of the cable by a suitable tool, as best seen in the view of FIGS. 8 and 9. Stop sleeves 14 are made of a suitable metal such as copper, aluminum, or stainless steel.

Figure 2:
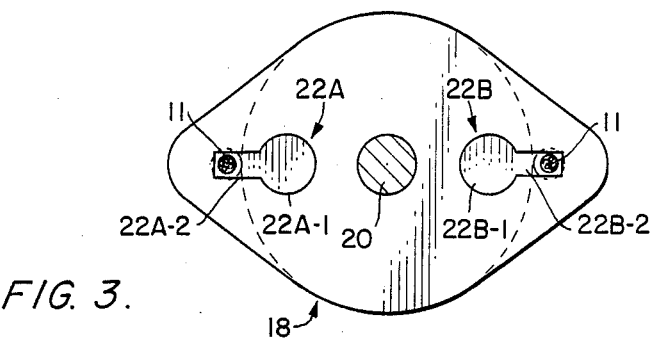
FIG. 2 is an enlarged view of the cable-supporting washer of the embodiment of FIG. 1, the washer having slots or keyways which receive the ends of the cable.
Figure 4:
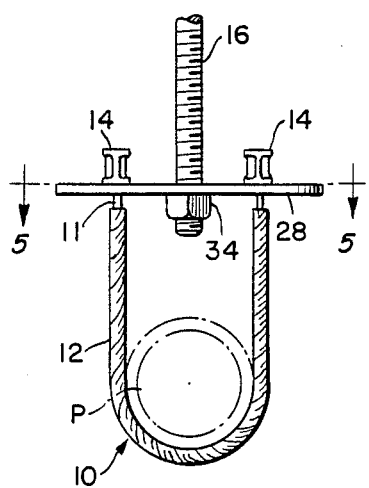
FIG. 4 is a view of a modified arrangement of the pipe hanger assembly, and in which only a single elongated washer is used to support the cable and the pipe supported by the cable.
Figure 5:
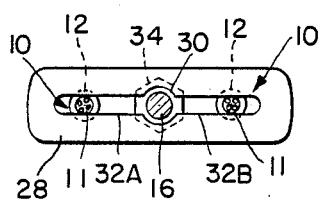
FIG. 5 is a view taken along line 5—5 of FIG. 4 showing the elongated washer which supports the pipe hanger of FIG. 4.

In stripping the coating or sheathing from the ends of the cable, as best seen in the views of FIGS. 1, 4, 8 and 9, each end of the cable is stripped for a distance inwardly from the end of the cable sufficient not only to permit placement of the respective stop sleeve 14 on a stripped portion of the cable, but also to provide a stripped portion of the cable beyond the location of the respective stop sleeves 14 to facilitate sliding of the ends of the cable along the slots 22A-2, 22B-2 of washer 18 in FIGS. 1 and 2, and also to facilitate sliding of the ends of the cable along the slotted portions 32A, 32B of washer 28 in FIGS. 4 and 5, as will be described hereinafter.

As will be explained hereinafter, depending upon the construction of the support washer, to be described, with which cable 10 is associated in a particular installation, in some cases the stop sleeves 14 are secured on the end or ends of the cable before the cable is assembled with respect to the support washer, while in other cases the stop sleeve 14 must be secured onto the end of the cable after the cable has been engaged with the support washer.

The pipe hanger assembly shown in FIG. 1 is supported by a vertical threaded stud member 16 which is suitably mounted or supported on the building structure. The pipe hanger assembly is mounted with respect to stud member 16 by the washer generally indicated as 18 in FIGS. 1 and 2. Washer 18 includes a central circular passage 20 by means of which washer 18 is received on stud 16. Washer 18 also includes two oppositely disposed openings respectively generally indicated at 22A and 22B which are positioned equidistant from the central opening 20. Each of the openings 22A and 22B includes a portion respectively indicated at 22A-1, 22B-1 of substantially circular configuration for approximately 300° of its periphery which is in communication on the laterally outwardly facing portion of its periphery with an elongated slot respectively indicated at 22A-2, 22B-2.

The hanger assembly generally indicated at 10 in FIG. 1 also includes a circular washer 24 (FIGS. 1 and 3) which includes a central passage 26 which permits positioning of washer 24 on the lower end of stud member 16 beneath washer 18 in supporting relation to washer 18 in the hanger assembly shown in FIG. 1. As seen in the assembled view of FIG. 1, a first nut member 28 is threaded onto the threaded portion of stud 16 at a desired height. Cable 10 having stop sleeves 14 already secured thereon has the respective ends of the cable inserted through the circular portions 22A-1 and 22B-1 of the respective apertures 22A and 22B of washer 18. The circular portions 22A-1 and 22B-1 are of sufficient size to permit introduction of the ends of the cable with the stop sleeves 14 already mounted on ends of the cable. After the ends of the cable have been introduced into the circular portions 22A-1 and 22B-1 of apertures 22A and 22B as just described, the ends of the cable are then slid along the respective slot portions 22A-2 and 22B-2 into substantially abutting relation to the peripherally outer ends of the respective slots 22A-2 and 22B-2.

With upper washer 18 having the opposite ends of cable 10 received in aperture portions 22A-2 and 22B-2, and with central aperture 20 of washer 18 engaging the lower end portion of support stud 16, washer 24 is then slipped over the lower end of threaded stud 16 beneath upper washer 18, and lower nut member 30 is then tightened in place beneath lower washer 24. The diameter of the lower circular washer 24 is just slightly less than the distance between the inner peripheries of the oppositely disposed ends of cable 12 when the respective ends of cable 12 are received in the laterally outer ends of the respective slotted portions 22A-2 and 22B-2, whereby washer 24 serves to prevent inward movement of the oppositely disposed cable ends along the respective slot portions 22A-2 and 22B-2, but instead maintains the ends of the cable at the peripherally outer ends of the respective slot portions 22A-2 and 22B-2. The use of washer 24 prevents any possibility of the ends of the cable, with the stop sleeves 14 secured thereto, dropping down through the circular aperture portions 22A-1 and 22B-1 and becoming detached from washer 18.

The pipe or duct or the like which is supported by the cable is indicated at P.

The pipe hanger assembly which is described in connection with the views of FIGS. 1, 2 and 3 may be used in connection with a pipe P which is already installed, in which case the cable 10 with the sleeves 14 already secured thereto may be first passed around the pipe and then engaged with the apertures 22A and 22B of washer 18 in the manner previously described; or, alternatively, with one end of cable 10 engaged with washer 18, and one free end of the cable remaining, the free end of the cable may be passed around the pipe P which is already installed, with the free end of the cable then being engaged with the corresponding slotted aperture of washer 18 in the manner previously described.

In both of the alternatives just mentioned, after both ends of cable 10 have been engaged with washer 18, washer 18 is then mounted on stud 16 and washer 24 and lower nut 30 are positioned on stud 16 beneath washer 18 as seen in the view of FIG. 1.

Figure 3:
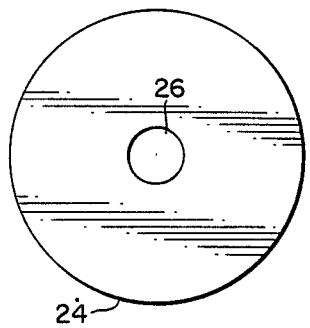
FIG. 3 is a plan view of a lower washer used in the assembly of FIG. 1 and which is positioned beneath the upper washer of FIG. 1 and which assists in holding the cable against undesired movement along the slots in the upper washer.

Alternatively, the pipe hanger assembly shown in FIGS. 1, 2 and 3 may be engaged with a pipe prior to the installation of the pipe. In this case, cable 10 with the end sleeves 14 thereon may be assembled relative to washer 18 in the manner previously described, and the hanger assembly comprising the assembled cable 10 and washer 18 may be slipped onto the pipe from the end of the pipe, with the hanger assembly subsequently being mounted on support stud 16.

There is shown in FIGS. 4 and 5 a modified mounting arrangement in which only a single washer generally indicated at 28 is employed. Cable 10 and end stop sleeve members 14 shown in FIGS. 4 and 5 are the same as those already shown and described in connection with the embodiment of FIGS. 1, 2 and 3 and will not be described again. Also, the cable hanger assembly of FIGS. 4 and 5 is mounted on a stud 16 which is the same as that already described in connection with the embodiment of FIGS. 1, 2 and 3. The single washer 28 which is used in the mounting arrangement of FIGS. 4 and 5 is of elongated rectangular configuration, and includes a central aperture 30 which is large enough to permit the washer 28 to be mounted on stud 16, and is also large enough to receive stop sleeves 14 which are already secured to each end of the cable, with each end of the cable and its corresponding stop sleeve 14 mounted thereon being inserted one at a time through the central aperture 30 into engagement with washer 28 before washer 28 has been engaged with stud 16. Washer 28 also includes elongated slot portions indicated at 32A and 32B which communicate with and extend in opposite directions from central aperture 30.

In assembling or mounting cable 10 with stop members 14 already secured thereto onto washer 28, and before washer 28 has been assembled onto the lower end of vertical stud 16, a first end of cable 10 with its stop sleeve number 14 affixed thereto is passed through the central aperture 30 and the end of the cable 10 which has just been inserted through aperture 30 is then slid along slot portion 32A to the position shown in FIGS. 4 and 5, for example. The second end of the cable with its stop sleeve member 14 also affixed thereto is then inserted through central aperture 30 and is then slid along the opposite slot 32B in the manner just described for the first end of the cable to a position such as that shown in FIGS. 4 and 5. With cable 10 thus installed in position with respect to washer 28, washer 28 is then assembled onto the lower end of threaded stud member 16 and nut member 34 is then threaded onto the lower end of threaded stud member 16 beneath washer 28 to maintain the cable hanger assembly at a predetermined height on stud 16. The combination of cable 10 and washer 28 as shown in the embodiment of FIGS. 3 and 4 may be used for supporting a pipe P which is either already installed, or for a pipe P which has not yet been installed.

Thus, if pipe P has already been installed, one or both ends of cable 10 having stop sleeves 14 already secured thereto may be passed around the already installed pipe, with the ends of the cable then being engaged with washer 28. On the other hand, if the pipe has not been installed, the cable hanger assembly comprising cable 10, stop sleeves 14, and washer 28 may be slipped onto pipe P from one end of the pipe before the pipe is installed.

Figure 6:
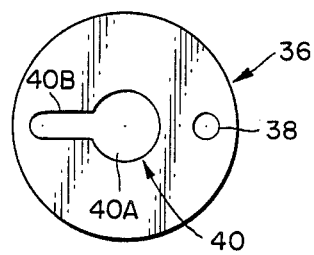
FIG. 6 is a modified type of washer which may be used in place of the washers of FIGS. 2 and 5.

There is shown in FIG. 6 a modified washer generally indicated at 36 which is adapted for use with a pipe which has already been installed. Thus, washer 36 includes a first aperture 38 which is only large enough to receive an end of the cable before the stop sleeve 14 has been secured thereto. Washer 36 also includes a second aperture generally indicated at 40 which has a circular portion 40A which extends for substantially 300° and a communicating slot portion 40B which has a dimension sufficient to slidably receive cable 10 but not sufficient to receive stop sleeve 14. In using washer 36, one end of cable 10 without stop sleeve 14 secured thereto, is inserted through aperture 38 and its corresponding stop sleeve 14 is then affixed to that end of the cable. The opposite end of the cable, which may have its stop sleeve 14 already secured thereto, is then passed around the pipe P which is already installed, with the end of the cable which has just been passed around the pipe then being passed through the circular portion 40A of aperture 40, the end of the cable inwardly of stop sleeve 14 then being slidably moved along the communicating slot portion 40B substantially to the end of slot portion 40B.

The hanger assembly comprising cable 10, which now encompasses the pipe and has one end of the cable engaged with aperture 38 and the other end of the cable engaged with slot portion 40B of aperture 40, is now engaged with stud 16 by engaging circular-shaped aperture portion 40A of aperture 40 of washer 36 with the lower end of stud 16 and securing a nut, such as nut 30 of FIG. 1, or nut 34 of FIG. 4, beneath washer 36 of FIG. 6. Aperture portion 40A of washer 36 is properly dimensioned to receive stud 16.

Figure 7:
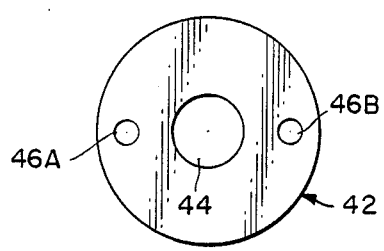
FIG. 7 is a view of still another modified type of washer which may be used with a pipe hanger which may be positioned on a pipe which has not yet been installed.

There is shown in FIG. 7 a still further modified type of washer which may be used in connection with a pipe whcih has not yet been installed. Thus, the washer generally indicated at 42 in FIG. 7 comprises a central aperture 44 which receives the stud member such as 16 in FIGS. 1 and 3. Washer 42 also includes a pair of diametrically opposite smaller apertures 46A and 46B. In using washer 42, the two ends of the cable are passed through the apertures 46A and 46B before the stop sleeves 14 have been secured to the ends of the cable, and the corresponding sleeve members 14 are then swaged or otherwise compressed onto the two ends of the cable after they have passed through apertures 46A and 46B. Thus, the washer shown in FIG. 7 is normally only used in an installation of a cable hanger which is to be installed onto the pipe prior to the installation of the pipe since the two ends of cable 10 are normally already secured to the washer 42 in the embodiment of FIG. 7 before mounting the hanger assembly onto the pipe, and thus in using the washer 42 of FIG. 7 there is not a free end of the cable 10 available for passing around the pipe, as is necessary when mounting the pipe hanger for use with a pipe whcih has already been installed.

In any of the pipe hanger installations hereinbefore described, the washer which serves as a support for the hanger assembly, such as washer 18 of the embodiment of FIGS. 1-3, inclusive, or washer 28 of the embodiment of FIGS. 4 and 5, may be stacked to provide a plurality of similar washers, such as the washer 18 or 28, to provide additional supporting strength, if necessary. This would also be true of installations embodying the washers 36 and 42, respectively, shown in FIGS. 6 and 7, in which a plurality of washers 36 or of washers 42 may be stacked to provide additional strength for supporting pipe P. In using a plurality of simlar washers in stacked relation, the washers are stacked in vertical registry. The ends of the cable engage the aperture means of the stacked washers which are in vertical registry with each other in the same manner as in the case of a single washer, and the end sleeves 14 on the opposite ends of the cable retain the ends of the cable with respect to the assembly of stacked washers in the same manner as in the case of a single washer.

Figure 10:
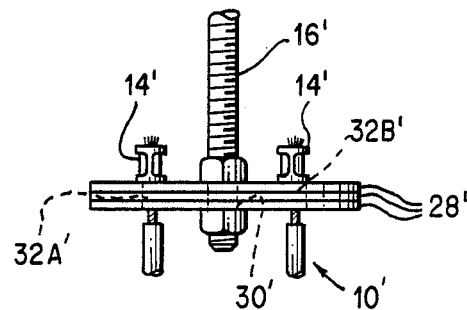
FIG. 10 is a fragmentary view showing the use of a plurality of washers in vertically stacked superimposed relation to each other.

There is shown in FIG. 10 a fragmentary view in which a plurality of washers 28' similar to washers 28 of FIG. 4 and 5 are stacked in vertically superimposed relation to each other. The stacked washers 28' and the cable 10' which they support are mounted on the vertical stud 16' which passes through the vertically aligned central apertures 30' of the vertically stacked washers 28. The two opposite ends of cable 10' are received in the ends of the vertically aligned slot-like apertures 32A', 32B' of the plurality of stacked washers 28', all in a manner similar to that shown in FIG. 4 and 5. The stop sleeves 14' are seated on the upper surface of the uppermost washer 28' of the vertically stacked washer 28'.

Referring to FIG. 11–14 a modification of the pipe hanger is shown. The cable 50 is supported on bracket 51. Cable 50 extends through opening 52 in bracket 51 and sleeve 53 is crimped and firmly fastened to the end of the cable. Bracket 51 is suitably fastened to a beam. Cable 50 extends downwardly through the aperture 54 in washer 55. Cable 50 carries an electrically insulating and cushioning sheath 56. The cable embraces the pipe 57 and is insulated to avoid electrolisis. The opposite end of the cable 50 extends through the washer 55 and is held in place by the crimped sleeve 58. The hanger is insulated to prevent electrolisis and corrosion and cushioned to eliminate shock or abrasion.

The cable hanger arrangement hereinbefore described has numerous advantages. For example, the multi-strand construction of the cable provides a flexibility which is not found in rigid pipe hangers. The flexibility of the cable pipe hanger permits the cable pipe hanger to better fit itself to the peripheral surface of the pipe P which is being supported than would normally be possible in connection with a pipe hanger made of more rigid material. It avoids a point contact at support of rigid hangers. Also, the inherent flexibility of the cable type hanger permits it to adapt itself to dimensional changes of the pipe being supported which may occur due to thermal changes of the pipe.

Also, the use of the plastic coating or sheathing on the pipe hanger prevents any electrolytic action which might otherwise occur when the metal of which the pipe hanger is made is different than the metal of the pipe which is being supported. When the insulated pipe hanger is being used to support a plastic pipe, the use of the insulating sheathing or coating on the metal cable tends to minimize abrasion of the plastic pipe by the hanger assembly. Most building codes require the hanger, because of electrolisis, to be of the same material as the pipe it is used with. Unless the hanger is insulated in some way as to prevent the different materials from coming in contact with each other as the applicant's invention, the materials used are limited. The applicant can use a strong steel hanger and a copper or alloyed pipe.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

The embodiments of the invention in which an exclusive property or privilege is claimed are defined as follows:

1. A universal pipe hanger assembly adapted to be suspended from a support for insulating and uniformly supporting the full under surface of a pipe or the like, comprising a substantially uniformly flat or planar washer member having a first aperture therethrough for receiving said support, said washer member comprising additional aperture means for receiving at least one end of a multistrand flexible metal cable, said washer member being adapted to be assembled in stacked relation to other similar washer members if required to add strength to said pipe hanger assembly, a flexible multi-strand metal cable hugging a pipe of any size for uniformly carrying the weight of the pipe across the width of the pipe and having the opposite ends of the cable respectively received in the aperture means of said washer member, an insulating and cushioning sheath on the exterior surface of said metal cable and encasing said cable along a substantial portion of the length thereof forming an intimate contact across the full under surface of the pipe insulating and cushioning the cable from the pipe to prevent electrolytic action and abrasion, and first and second substantially identical stop sleeve members distinct from said multi-strand cable but respectively compressively secured to the respective opposite ends of said metal cable and seated on said washer member around the aperture means to retain said cable on said washer member and distribute the load carrying support over the length of the stop sleeves.

2. A pipe hanger assembly as defined in claim 1 in which said metal cable defines the support for supporting said hanger and embraces said pipe and connects to said washer.

3. A pipe hanger assembly as defined in claim 1 in which said first aperture means receives a stud and is distinct from and does not communicate with said additional aperture means, means for locking said stop sleeve members in said washer member.

4. A pipe hanger assembly as defined in claim 1 in which said first aperture means communicates with both of said additional aperture means so that each of the ends of said cable may be inserted in said first aperture means and may then be slidably moved into a corresponding additional aperture means communicating with said first aperture means.

5. A pipe hanger assembly as defined in claim 1 in which said first aperture means is of generally circular shape and in which both of said additional aperture means are substantially in the form of linear slots which each respectively communicate at one end thereof with substantially diametrically opposite poritons of said first aperture means, whereby each of said opposite ends of said multi-strand cable with said stop sleeves secured to said opposite ends thereof may be inserted in said first aperture means before said washer has been positioned on said support, with the cable portions inwardly of the respective end sleeves then being slidably moved from said first aperture means along the corresponding linear slot portions.

6. A pipe hanger assembly as defined in claim 1 comprising a plurality of said flat or planar washer members in stacked relation to add strength to said pipe hanger assembly, said plurality of washer members being stacked so as to have corresponding portions thereof in vertical registry with each other, said flexible multi-strand metal cable having the opposite ends thereof respectively received in the respective oppositely disposed additional aperture means of said stacked washer members, and a corresponding one of said substantially identical stop sleeve members secured to each of the respective opposite ends of said metal cable to retain said cable engaged with said washer members.

7. A universal hanger assembly adapted to be suspended from a support for uniformly supporting a pipe of any of various materials and diameters or the like, comprising a substantially uniformly flat or planar washer member having a first aperture means therethrough for receiving said support, said washer member comprising additional aperture means for receiving at least one end of a flexible multi-strand metal cable, said washer member due to its substantially flat or planar character being adapted to be assembled in stacked relation to other similar washer members if required to add strength to said pipe hanger assembly, a flexible multi-strand metal cable embracing the peripheral underside of the pipe for providing uniform support across the width of the pipe, and having the opposite ends thereof respectively received in the aperture means of said washer member, a sheath of insulating and cushioning material coated on the exterior surface of said metal cable and encasing said cable along a substantial portion of the length thereof and forming an intimate contact across the full under surface of the pipe insulating and cushioning to avoid electrolytic action and abrasion between the cable and the pipe, first and second substantially identical stop sleeve members distinct from said multi-strand metal cable but respectively compressively secured to the respective opposite ends of said metal cable engaging said washer member at said aperture means to retain said cable on said washer member, at least one end of said multi-strand metal cable with a corresponding stop sleeve secured thereon being inserted in said first aperture means, with the cable portion inwardly of the corresponding end sleeve of said at least one end then being slidably moved from said first aperture means along the additional aperture means whereby to position said at least one end of said cable in the corresponding additional aperture means.

8. A pipe hanger assembly as defined in claim 7 in which said metal cable is coated or sheathed with a plastic material.

9. A pipe hanger assembly as defined in claim 7 in which said metal cable is not coated or sheathed with said insulating material at the ends thereof where said end sleeve members are secured to said cable.

* * * * *